United States Patent [19]

Levin

[11] Patent Number: 4,969,449
[45] Date of Patent: Nov. 13, 1990

[54] DISPOSABLE BARBECUE GRILL COVER

[76] Inventor: Eugene Levin, P.O. Box 391412, Mountain View, Calif. 94039

[21] Appl. No.: 367,816

[22] Filed: Jun. 19, 1989

[51] Int. Cl.$^5$ .............................................. F24C 15/16
[52] U.S. Cl. ................................... 126/332; 126/25 R; 126/221; 126/39 M; 428/179; 428/181
[58] Field of Search ................ 126/39 M, 25 R, 25 C, 126/9 A, 221, 211, 332; 428/179, 181

[56] References Cited

U.S. PATENT DOCUMENTS

| | | | |
|---|---|---|---|
| 2,593,592 | 4/1952 | Miller | 126/221 X |
| 3,323,508 | 6/1967 | Holman . | |
| 3,385,282 | 5/1968 | Lloyd | 126/25 R X |
| 3,424,145 | 1/1969 | Stitt | 126/25 R |
| 3,490,123 | 1/1970 | Clark | 126/39 M |
| 3,555,994 | 1/1971 | Nemetz . | |
| 3,570,469 | 3/1971 | Jones . | |
| 4,240,398 | 12/1980 | Lindop | 126/25 R |
| 4,763,639 | 8/1988 | Goldsworthy . | |

Primary Examiner—Larry Jones
Attorney, Agent, or Firm—Skjerven, Morrill, MacPherson, Franklin & Friel

[57] ABSTRACT

A disposable foil grill is disclosed which consists of a corrugated and perforated sheet of heavy duty aluminum foil. The corrugations allow smoke to access virtually the entire bottom surface of the food being cooked so that the desired barbecue flavor is obtained. Fat from meat being cooked drips into troughs formed by the corrugation and exits through holes in the troughs onto the coals for generation of the smoke and flame which give food a desireable barbecue flavor. Another advantage of the disclosed disposable grill cover is that the distances between adjacent troughs may be changed by a slight pull on the ends of the foils to perfectly align the troughs with the spacings between the wire grating of the grill. In this way, holes formed in the bottom of the troughs for fat drippings do not allow the drippings to come in contact with the wire grating.

7 Claims, 5 Drawing Sheets

DISPOSABLE BARBECUE GRILL COVER

FIELD OF THE INVENTION

This invention relates to disposable barbecue grill covers and in particular to an improved barbecue grill cover which may be compactly packaged and which may be used with a wide variety of types of standard grill surfaces.

BACKGROUND OF THE INVENTION

Various patents have been issued to inventors of disposable grill covers which are generally for the purpose of protecting the underlying permanent grill from the drippings, etc. of the food being cooked. A description of two of these patents follow.

Pat. No. 4,763,639 to Goldsworthy describes a disposable circular flat sheet of foil with holes formed therein for the primary purpose of regulating the flow of air to the charcoal. Since the Goldsworthy foil is in the form of a circular flat sheet, a drawback to this foil is that food may easily stick to the foil, and the food drippings may still come in contact with the permanent grating upon which the disposable foil lies. Further, since the foil is flat, smoke cannot circulate under the food being cooked and thus a barbecue flavor may not be fully obtained. Further, since the foil is flat, the juices from the meat do not necessarily drip through the holes in the foil but may be undesireably retained within the meat.

Pat. No. 3,555,994 to Nemetz describes a disposable foil cover for a grill of a barbecue to specifically protect the wire grill from being covered with grease drippings. The disposable cover of Nemetz is only applicable for wire grills having wire spacings perfectly aligned with the disposable foil cover.

The above-described disposable grill covers are not easily commercially packaged and have a number of drawbacks. What is needed in this field is a disposable grill cover which: may be used with a variety of types of permanent grill gratings; enables a food being cooked to obtain a desired barbecue flavor; enables drippings from a meat being cooked to drip away from the meat; eliminates any problem with meat sticking to a foil surface; and may be compacted into a commercially desireable package.

SUMMARY OF THE INVENTION

A disposable foil grill cover is disclosed which consists of a corrugated and perforated sheet of heavy duty aluminum foil. The corrugations allow smoke to access virtually the entire bottom surface of the food being cooked so that the desired barbecue flavor is obtained. Fat from meat being cooked drips into troughs formed by the corrugation and exits through holes in the troughs onto the coals for generation of the smoke and flame which give food a desireable barbecue flavor.

Another advantage of the corrugated disposable grill cover is that the distances between adjacent troughs may be changed by a slight pull on the ends of the foil to perfectly align the troughs with the spacings between the wire grating of the grill. In this way, holes formed in the bottom of the troughs for fat drippings do not allow the drippings to come in contact with the wire grating.

Further, the crests of the heavy duty aluminum foil only contact a minimum portion of the food being cooked and, thus, sticking of the food to the foil is minimal.

The corrugations also allow for compact packaging, wherein the foil is initially compressed in an accordion type fashion, and a desired amount of foil is merely torn off and extended to the desired dimensions.

DETAILED DESCRIPTION OF THE DRAWINGS

Figure 1:
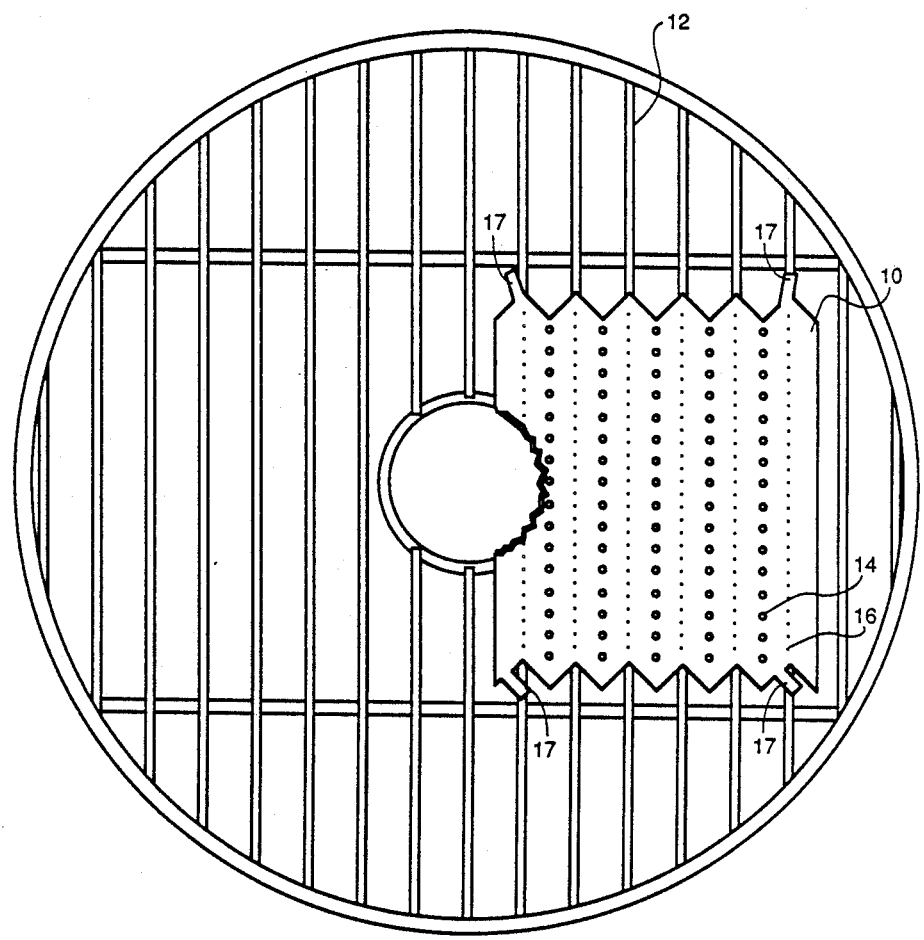
FIG. 1 shows a preferred embodiment of the invention showing a piece of corrugated foil with holes formed in the troughs of the foil.

FIG. 1 shows a preferred embodiment of the invention, wherein a corrugated piece of heavy duty aluminum foil 10 is placed on the grating 12 of a standard barbecue grill.

Holes 14, having diameters between ¼ inch and ½ inch, are formed in the troughs of the corrugated foil 10 to allow drippings to drain from the troughs. In one embodiment, the holes 14 in each trough are spaced 1 inch to 2 inches apart. Holes 14 also allow any smoke to enter therethrough and circulate below the food being cooked. Holes 14 are small enough to prevent flames caused by meat drippings from burning the bottom of the food being cooked.

Crests 16 of corrugated foil 10 are aligned with wire grating 12 so that the troughs of the corrugated foil 10 are situated in the spacings between the wire grating 12. Thus, the weight of food placed on foil 10 will be totally supported by grating 12. In a preferred embodiment, the thickness of heavy duty aluminum foil is between approximately 0.5 mils and 4.0 mils thick to avoid tearing and for ease of handling.

To enable crests 16 to substantially align with the wire grating 12, foil 10 may be elongated or compressed simply by pulling the sides of the foil apart or pushing the sides together.

In the embodiment of FIG. 1, edge tabs 17 are formed at regular intervals along the edge of foil 10 to optionally secure foil 10 to the wire grating 12.

Figure 2:
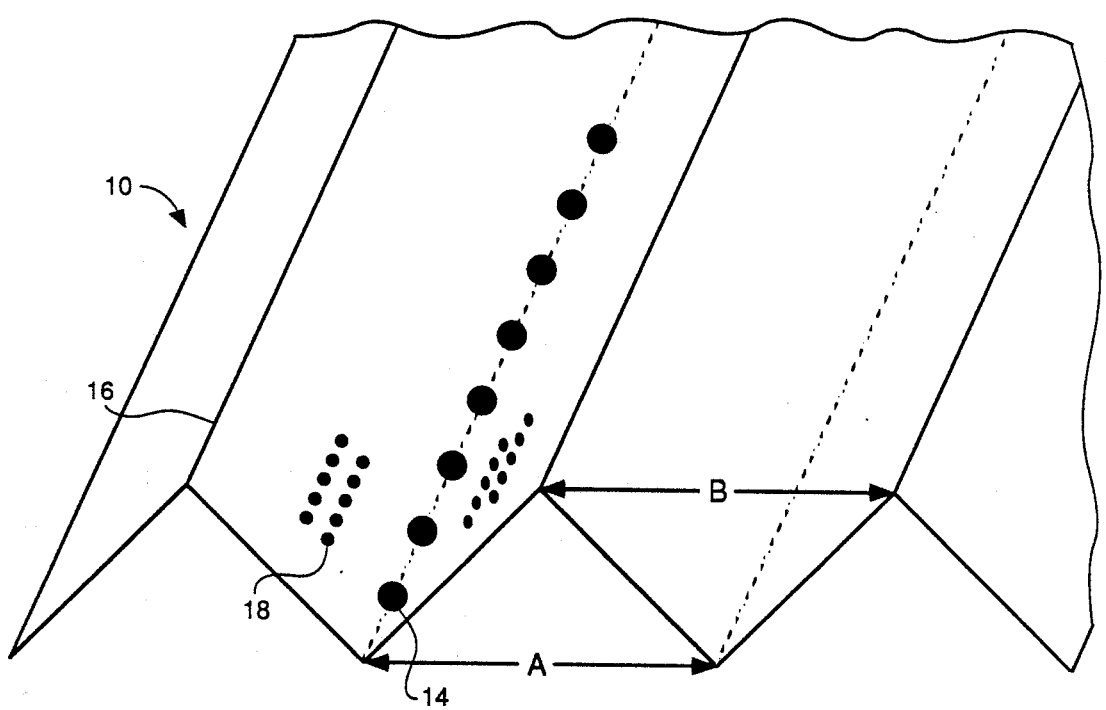
FIG. 2 shows a close-up of the foil of FIG. 1 showing smoke holes formed in the foil.

Shown in FIG. 2 is a close-up of foil 10 of FIG. 1 wherein smoke holes 18 are formed in a plurality of rows in the sides of the corrugations. Holes 18 are made relatively small so as not to significantly lower the rigidity or strength of the corrugated foil 10. Holes 18 may be made small since only smoke, and not the fat drippings, need pass through the holes 18. In a preferred embodiment, holes 18 are approximately ⅛ inch in diameter. In one embodiment, between four and ten holes 18 per inch are formed in the sidewalls of each corrugation.

In FIG. 2, dimension A between adjacent troughs is identical to the dimension B between adjacent crests. Since a standard grill has a wire framework spaced at approximately ½ inch apart, foil 10 should be formed such that when dimension B is approximately ½ inch, sufficient space will exist between each trough and the bottom surface of the food being cooked so that the drippings of the meat do not come in contact with the meat while flowing in the trough. In one embodiment, when distance B is ½ inch, the distance between the bottom surface of the food being cooked and the troughs is greater than ¼ inch.

Figure 3:
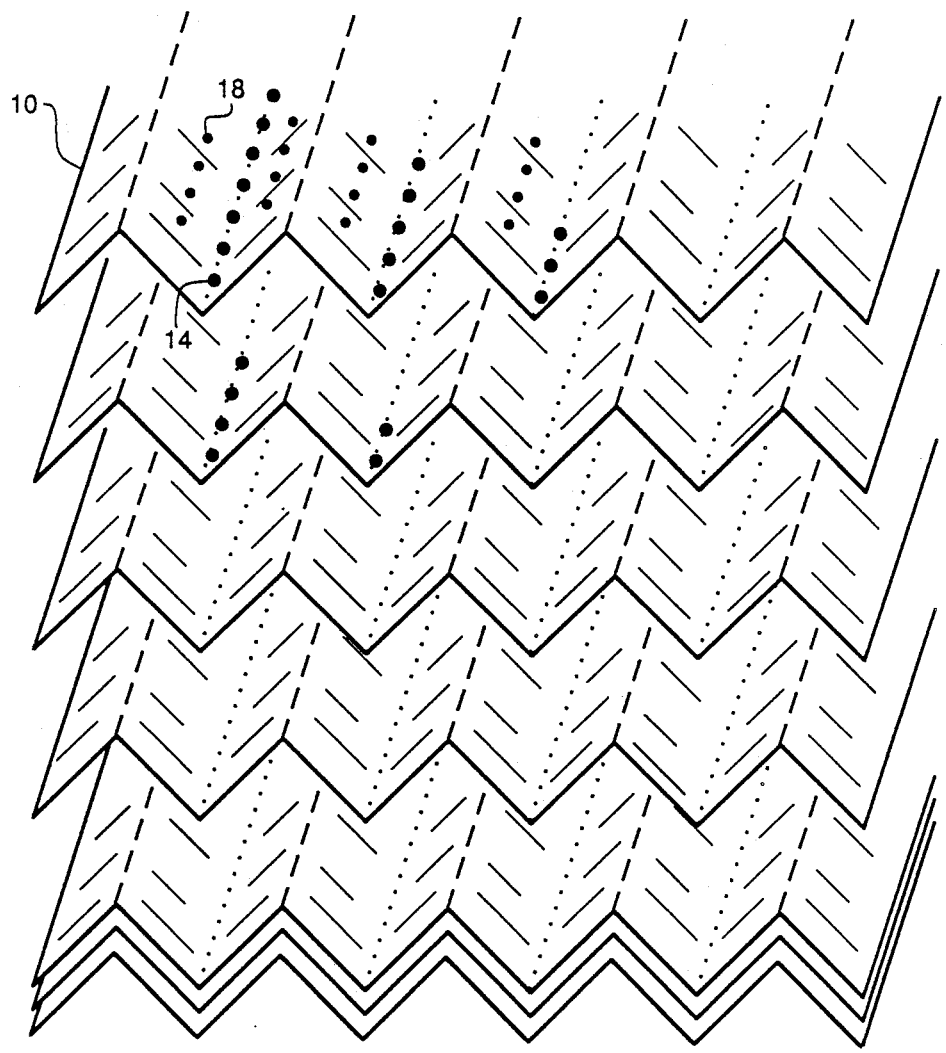
FIG. 3 shows how the corrugated foil of FIG. 1 may be nested for packaging.

Shown in FIG. 3 is one way to commercially package a plurality of corrugated foil grill covers similar to those of the embodiments of FIGS. 1 and 2. In FIG. 3, individual foil sheets of a size to enable a single portion of food to be supported are simply stacked together and packaged for sale. In one embodiment, the individual foil sheets have width and length dimensions between 6–12 inches. This type of packaging may enable a simple way of forming holes 14 and 18 in the foil in a hole punching process, wherein after flat pieces of foil are stacked on top of one another, holes 18 and 14 are punched in the flat sheets of foil. The plurality of flat sheets are then stamped to achieve the corrugated shape shown in FIG. 3. An additional advantage of the nested packaging of the foil sheets is that two or more sheets may be easily stacked to obtain a more rugged cooking surface.

Figure 4:
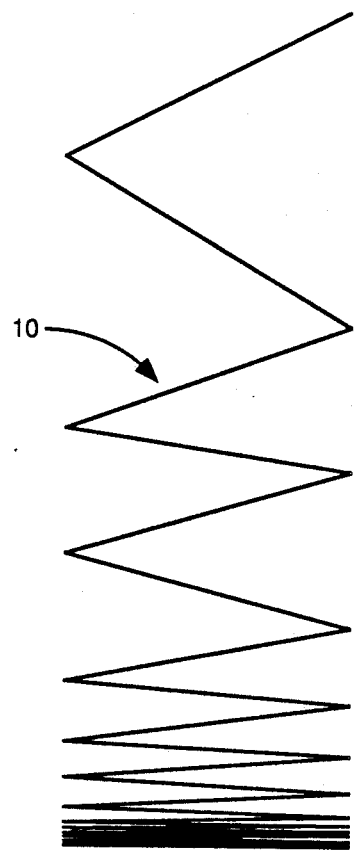
FIG. 4 shows another form of packaging wherein the corrugated foil of FIG. 1 is compressed in an accordion type fashion.

Shown in FIG. 4 is another way to commercially package corrugated foil grill covers similar to those of the embodiments of FIGS. 1 and 2. In FIG. 4, a continuous corrugated foil sheet is formed in an according type fashion and compressed into an extremely compact package. Holes may be then punched in the folded package to correspond with the placement of holes 14 and 18, shown in FIG. 2. A desired amount of foil may simply be torn off and placed on the wire grating of a barbecue.

As another feature of the heavy duty corrugated foil 10, shown in FIGS. 1–4, the corrugations provide sufficient strength to the foil 10 so as to support a typical piece of food being cooked even if the crests are not aligned with, and supported by, a wire grating. Hence, the corrugated foil may be used even without a wire grating support, such as in a situation where food is merely placed on the foil and the foil is laid upon a campfire or other type of fire which is not within a barbecue grill housing.

Figure 5:
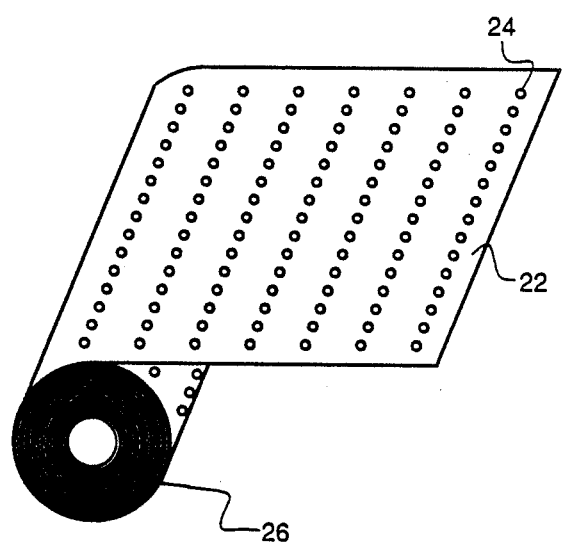
FIG. 5 shows another embodiment of the invention which consists of a roll of heavy duty aluminum foil containing rows of holes wherein a section may be torn for use as a disposable barbecue grill cover.

Shown in FIG. 5 is a second embodiment of the invention, wherein flat foil 22 has holes 24 formed in rows along the entire length of foil 22. When needed, a desired length of foil 22 is torn from roll 26 and placed on the wire grating of a grill. Holes 24 are aligned with the spacings between the wire grating, and the foil 22 is then indented with a finger or side of the hand to form troughs within the spacings between the wire gratings. In this embodiment, unlike prior art circular foil disposable grill covers not incorporating rows of holes, foil 22 is easily packaged and only the necessary amount may be used without waste. In a preferred embodiment, the rows of holes 24 are spaced approximately 6/10 to 7/10 inch apart to enable holes 24 to be aligned with standard ½ inch spacings between the wire grating after indenting of the foil. Thus, a variety of disposable foil grill covers have been shown which overcome many of the drawbacks of prior art disposable grill covers and which enable the foil to be commercially packaged.

The present invention has been described with reference to the preferred and alternative embodiments thereof, however, the invention is not intended to be limited to the herein described embodiments. Various modifications in forms and structure will become obvious to those skilled in the art while keeping with the spirit and scope of the invention.

What is claimed is:

1. A disposable foil grill cover for use with a grill which includes a food supporting grate, said cover comprising:

corrugated foil of a predetermined length and width, said cover being corrugated and having crests and troughs arranged in parallel, adjacent crests and troughs having a predetermined length therebetween, said cover further including a first plurality of holes in said foil along the lengths of said troughs for allowing drippings from food being cooked to drip through said holes, wherein said predetermined lengths allow said corrugations to expand or contract to space said crests to coincide with gratings of a grill.

2. The foil of claim 1 further comprising a second plurality of holes formed in sidewalls of said foil between said crests and said troughs for allowing smoke to enter therethrough.

3. The foil of claim 1 wherein the thickness of said foil is between 0.5 mils and 4.0 mils.

4. The foil of claim 1 wherein holes of said first plurality of holes formed in said troughs have a diameter between approximately ¼ inch and ½ inch.

5. The foil of claim 1 wherein said corrugated foil has width and length dimensions between 6–12 inches.

6. The foil of claim 1 wherein said corrugated foil is packaged in an accordion type fashion and in a continuous form to provide a source of corrugated foil sheets having selectable lengths.

7. The foil of claim 1 wherein said foil includes edge tabs formed at intervals along side edges of said foil.

* * * * *